United States Patent Office 3,600,285
Patented Aug. 17, 1971

3,600,285
MERCURY RECOVERY
Edward J. Botwick, New Haven, and Darrell B. Smith, Cheshire, Conn., assignors to Olin Corporation
No Drawing. Filed Oct. 21, 1969, Ser. No. 868,206
Int. Cl. C01d 1/08
U.S. Cl. 204—99          5 Claims

ABSTRACT OF THE DISCLOSURE

The recovery of mercury chloride from weak brines effluent from mercury cathode electrolytic cells by contacting said effluent with activated carbon, washing said carbon with water, then heating in a stream of inert gas and condensing mercury chloride by cooling the gas.

---

This invention relates to the purification of alkali metal chloride brines and more particularly to the removal of mercury from weak brines effluent from mercury cathode electrolytic cells and the recovery of the mercury removed from such brines.

In the electrolysis of alkali metal chloride brines in mercury cathode cells, a strong, aqueous solution of alkali metal chloride is introduced into the cells where a portion of the solute is decomposed. The alkali metal is dissolved in the mercury cathode to form an alkali metal amalgam and chlorine gas is liberated at the anodes. Weak brine is removed from the cells. It is usually dechlorinated, fortified with additional solute, alkalized, purified, acidified and returned to the cells. In mercury cell operation, the purity and concentration of the brine are especially important for efficient operation. As a result, the brine treating plant may be larger and require more operating personnel than the electrolysis portion of the plant. As much as 10,000,000 gallons or more of brine may be in process in many mercury cell plants. Details of the prior art operation of both parts of a mercury cell plant are well-known; see, for example, Ind. Eng. Chem. v. 45, No. 9, pp. 1824–1835 (1953). The effluent weak brine contains dissolved chlorine and mercury which cause economic losses and disposal problems.

Effluent weak brine has usually been dechlorinated by aeration or vacuum or both, principally to avoid corrosion of equipment used in handling the brine in subsequent operations. Usually the dechlorinated weak brine is passed through a bed of salt crystals, suitably rock salt, to dissolvers, post dissolvers, treating tanks, surge tanks, settlers, filters and storage tanks. The chlorine removed from the brine has usually been considered too dilute and difficult to recover to justify its recovery as saleable liquid chlorine. It has frequently been absorbed in lime or limestone and discarded. One such brine system is shown diagrammatically in Chem. Engineering, June 1950, pp. 178–181. In spite of the fortification and purification of the brine for recycle, it is necessary to purge a portion of the brine from the system and replace it with fresh brine in order to maintain various impurities within acceptable limits.

Mercury in the effluent brine results from the chlorination of the mercury to form a soluble mercury salt which dissolves in the brine as it passes through the cell. The brine leaving the cell often contains as much as 50 parts of mercury per million parts of brine and in some cases a considerably greater amount. This loss of mercury, while small per pass, becomes considerable when a battery of cells is operated over an extended period of time. In a plant producing 500 tons per day of chlorine and caustic soda, this loss may amount to $100,000 or more per year. Additionally, because of the noxious nature of mercury compounds, problems of atmospheric and stream pollution are encountered in the disposal of the brine containing these mercury salts.

Canadian Pat. 595,813 issued Apr. 5, 1960, disclosed that anion exchange resins remove dissolved mercury from brine and that the mercury can be eluted from the resins by acid washing. Mercury recovery from the elutriate by precipitation with slaked lime and heating the precipitate is suggested.

U.S. Pat. 3,085,859 issued Apr. 16, 1963, discloses the removal of dissolved mercury from brine by contacting it with anion exchange resin and removing the mercury from the resin with aqueous sodium sulfide. Mercury recovery from the sulfides of mercury by "well-known chemical reduction or cinnabarian retorting techniques" is suggested.

U.S. Pat. 3,213,006 issued Oct. 19, 1965, to Crain et al. discloses dechlorination of mercury-containing brine, contacting it with anion exchange resin to remove the anionic mercury, elutriation with aqueous sodium sulfide, mixing the elutriate with chlorinated brine to re-form mercuric chloride and returning the mercuric chloride to the brine entering the electrolytic cell where it is electrolyzed to re-form mercury metal.

One object of the present invention is to provide a cheaper, simpler and more economical process for recovering mercury from the brine effluent from mercury cathode electolytic cells.

A further object of the present invention is to provide a method for removing the mercury from the carbon as mercuric chloride which is a form which is suitable for direct recycle to the brine and reuse as mercury metal.

A still further object of the present invention is to accomplish the foregoing objects in fewer operations than required according to the prior art.

Other and further objects will appear in the course of the following description.

According to the present invention, dissolved mercury in these brines is recovered by contacting said depleted brine with active carbon, washing the active carbon containing adsorbed mercury chlorides with water, heating the washed carbon at 375° to 500° C. in a stream of inert carrier gas, cooling said stream of carrier gas and condensing mercury chlorides therefrom, and dissolving the recovered mercury chlorides in the brine introduced into the cells.

More particularly, where said depleted brine is divided into a stream of recycle brine and a stream of purge brine and said stream of recycle brine is re-saturated and purified and returned to the cells, the said stream of purge brine is first contacted with active carbon to recover dissolved mercury and then said stream is purged from the process.

The active carbon containing adsorbed mercury is washed with water before subjecting it to the carrier gas at elevated temperatures since otherwise evaporation of the brine covers the carbon with a residue of salt which materially retards the vaporization of the mercury chlorides.

The active carbon suitable for use according to the invention is any active carbon well-known to the art. It may be derived from petroleum coke, sugar, peach pits or other conventional sources suitably activated, usually by ignition in a limited supply of air.

The active carbon is suitably used until it passes brine containing more than an acceptable quantity of dissolved mercury, after which it is washed and heated to recover adsorbed mercury chlorides and is thus reactivated and is suitable for re-use.

The inert gas is heated in a furnace or in any other suitable manner to 375° to 500° C. and passed through the carbon containing adsorbed mercury chlorides to volatilize them from the carbon and to carry them to a condensing zone where mercury chlorides are separated and recovered. The gas carrying mercury chlorides is cooled to form solid mercury chlorides and the gas is discharged or, preferably, recycled, reheated and re-used. Alternatively, the stream of gas is washed with water to separate the mercury chlorides in solution in the water and the aqueous solution is added to the brine introduced into the cells.

Nitrogen is the cheapest and most readily obtained suitable inert gas for effecting the recovery of mercury chlorides from the active carbon but any other gases inert to carbon and the mercury chlorides at 375° to 500° C. are also suitable. Examples include hydrogen, helium, argon, hydrogen chloride and chlorine.

The temperatures suitable for vaporization of the mercury chlorides are from 375° to 500° C. The mercury chlorides have vapor pressures equal to atmospheric at about 300° to 400° C. and are rapidly vaporized from the carbon at 375° to 500° C. At lower temperatures, the vaporization rate is slow and uneconomical amounts of carrier gas are required for complete recovery of the mercury chlorides. Higher temperatures appear to be unnecessary. Particularly economical and advantageous results are obtained in the range of 400° to 450° C.

The mercury chlorides, recovered from the inert gas stream as solids or in aqueous solution are added to the recycling brine at any suitable point before return to the electrolytic cells, preferably after alkalization and acidification of the brine, since some of the dissolved mercury may be lost in the alkalizing mud if added prior to the acidification step in the brine purification operations. When the mercury chlorides are dissolved in the acid brine and returned to the electrolytic cells, the mercury is at least in part re-converted to elemental mercury and forms part of the flowing mercury cathode.

It is surprising that the non-polar activated carbon is effective in adsorbing the ionic mercury dissolved in the brine when it is to be expected that the polar adsorbents such as the ion exchange resins would be more effective for this purpose. Generally the non-polar activated carbon is more effective in adsorbing non-ionic impurities such as high molecular weight tannins, coloring matters and polymeric materials.

In the operation of mercury cells where the brine passes once through the cells, the entire effluent stream is treated by the process of the present invention. Usually, most of the brine is refortified with salt, purified and recirculated to the cells in order to make the operation economical. However, a purge stream is usually diverted from the stream of effluent brine and discarded. The recovery process of the present invention is then suitably applied to the purge stream to avoid loss of mercury and pollution.

Advantageously, parallel beds of active carbon are provided and the stream of effluent brine is passed first to one and then to another of such beds. The beds which are not receiving brine are treated to remove the mercury and to regenerate the carbon for re-use and then are returned to service.

The alkali metal chloride brines electrolyzed in mercury cells include especially those of sodium chloride, potassium chloride and lithium chloride and, of these, sodium chloride is the most economically important. However, the method of the invention is equally applicable to brines of potassium chloride, lithium chloride and other alkali metal chlorides.

EXAMPLE I

Sodium chloride brine containing 22 percent by weight of NaCl and 10 p.p.m. of mercuric ion and having a pH of 2.5 was passed through 130 inches of 6 to 14 mesh activated cocoanut charcoal at room temperature at a rate of 8.5 gallons per minute per square foot of cross-sectional area. The effluent brine contained 0.02 p.p.m. of mercuric ion. The column of carbon was washed with water and then heated in a stream of nitrogen at a temperature of 450° C. Mercuric chloride was condensed by cooling the gas and amounted to 70 percent of the mercury in the influent brine. The mercuric chloride was suitably dissolved in the brine introduced into the mercury cell.

EXAMPLE II

Sodium chloride brine was passed through active carbon as described in Example I until the carbon contained 3.30 mg. of mercury in the form of chloride per gram of carbon. Without washing, the carbon was stripped of mercury by a stream of hot nitrogen at 450° C. The mercuric chloride was condensed from the gas stream by cooling and corresponded to 1.38 mg. of mercury per gram of carbon or 41.8 percent of the mercury on the carbon.

The carbon was washed with water and the stripping was repeated. An additional mercuric chloride equivalent to 1.62 mg. of mercury per gram of carbon was recovered. Total recovery was 88 percent. The mercuric chloride was suitably dissolved in the brine introduced into the mercury cell.

What is claimed is:

1. In the operation of mercury cathode cells for the electrolysis of aqueous alkali metal chloride brines wherein chlorine and alkali metal amalgam are the primary products, substantially saturated brine is introduced into the cells and partially depleted brine containing dissolved mercury chlorides is removed from the cells, the improvement of recovering said dissolved mercury chlorides by contacting said depleted brine with active carbon, washing the active carbon containing adsorbed mercury chlorides with water, heating the washed carbon at 375° to 500° C. in a stream of inert carrier gas, cooling said stream of carrier gas and condensing mercury chlorides therefrom, and dissolving the recovered mercury chlorides in the brine introduced into the cells.

2. Method as claimed in claim 1 in which depleted brine is divided into a stream of recycle brine and a stream of purge brine, said stream of recycle brine is re-saturated and purified and returned to the cells and said stream of purge brine is first contacted with active carbon to recover dissolved mercury and then purged from the process.

3. Method as claimed in claim 1 in which said washed carbon is heated at 400° to 450° C. and said carrier gas is nitrogen.

4. Method as claimed in claim 1 in which said stream of depleted brine is contacted in the first of at least two parallel beds of active carbon while a second bed of active carbon is washed, heated to recover mercury chlorides and then cooled and said stream of depleted brine is contacted in said second bed while said first bed is washed, heated and cooled.

5. Method as claimed in claim 1 in which said alkali metal chloride is sodium chloride.

References Cited

UNITED STATES PATENTS

| | | | |
|---|---|---|---|
| 3,402,113 | 9/1968 | Tsao | 204—99 |
| 3,536,597 | 10/1970 | Yamori et al. | 204—99 |

WINSTON A. DOUGLAS, Primary Examiner

H. A. FEELEY, Assistant Examiner

U.S. Cl. X.R.

23—87R; 210—32